June 18, 1957  R. H. MEIER  2,795,917
CONTROL MECHANISM FOR COTTON PICKING UNITS
AND MOISTENING MEANS
Filed Dec. 29, 1954   3 Sheets-Sheet 1
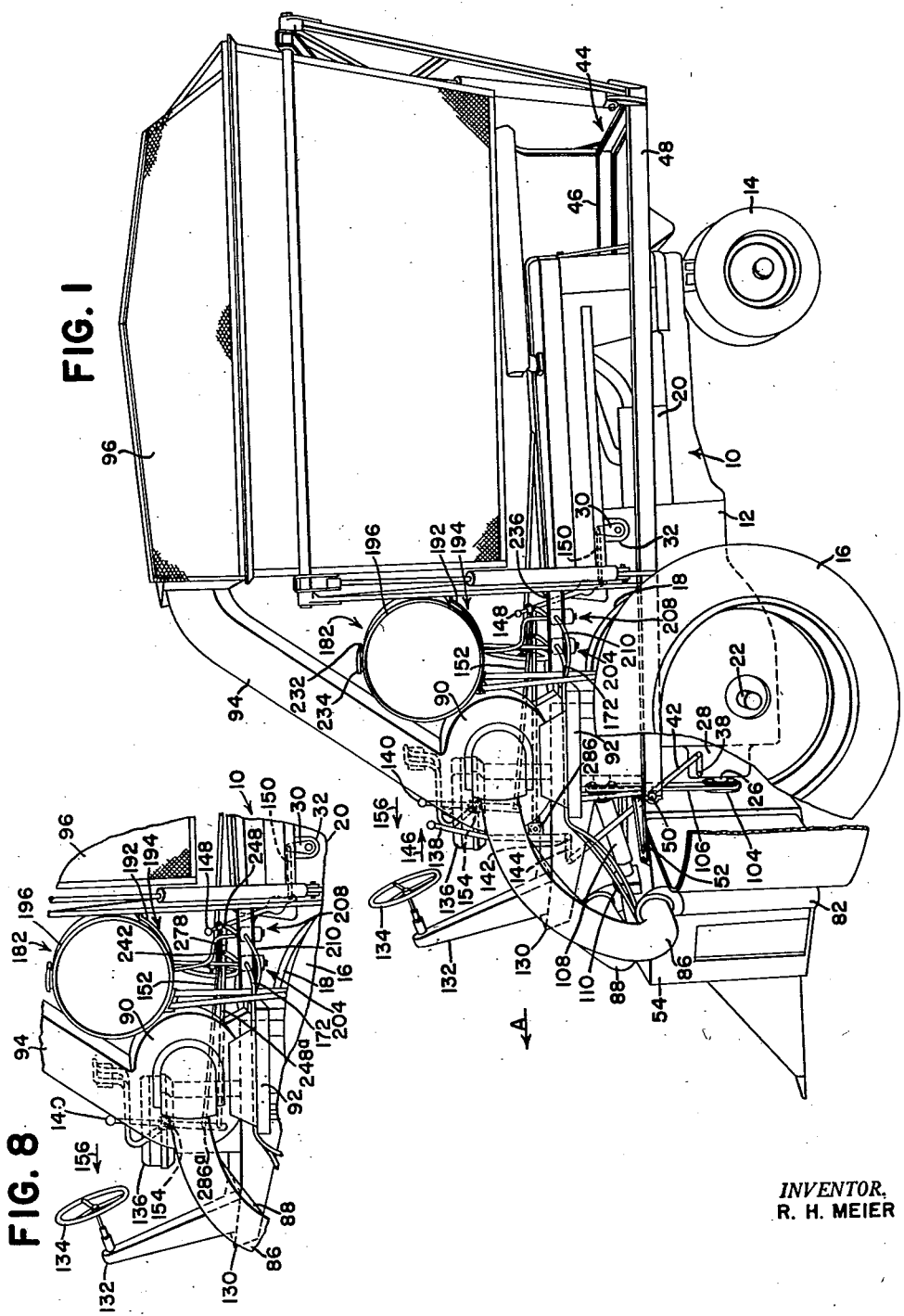
INVENTOR.
R. H. MEIER June 18, 1957
R. H. MEIER
2,795,917
CONTROL MECHANISM FOR COTTON PICKING UNITS
AND MOISTENING MEANS
Filed Dec. 29, 1954
3 Sheets-Sheet 2
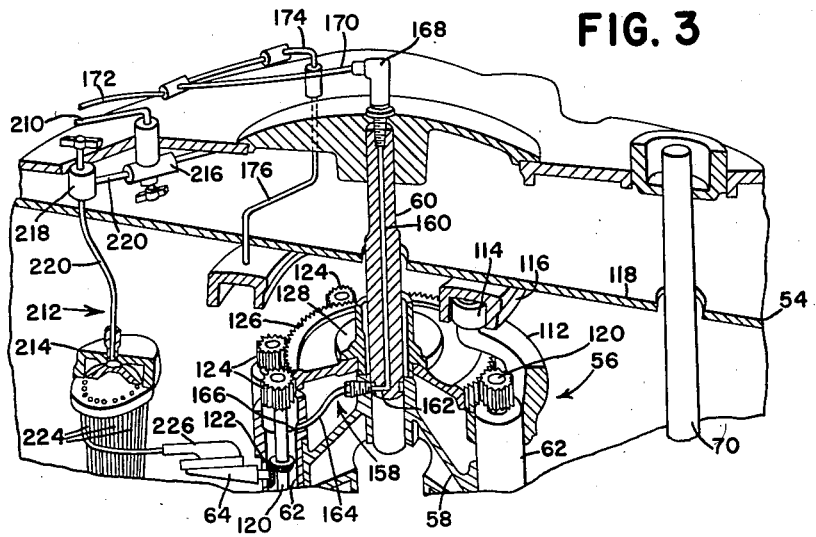
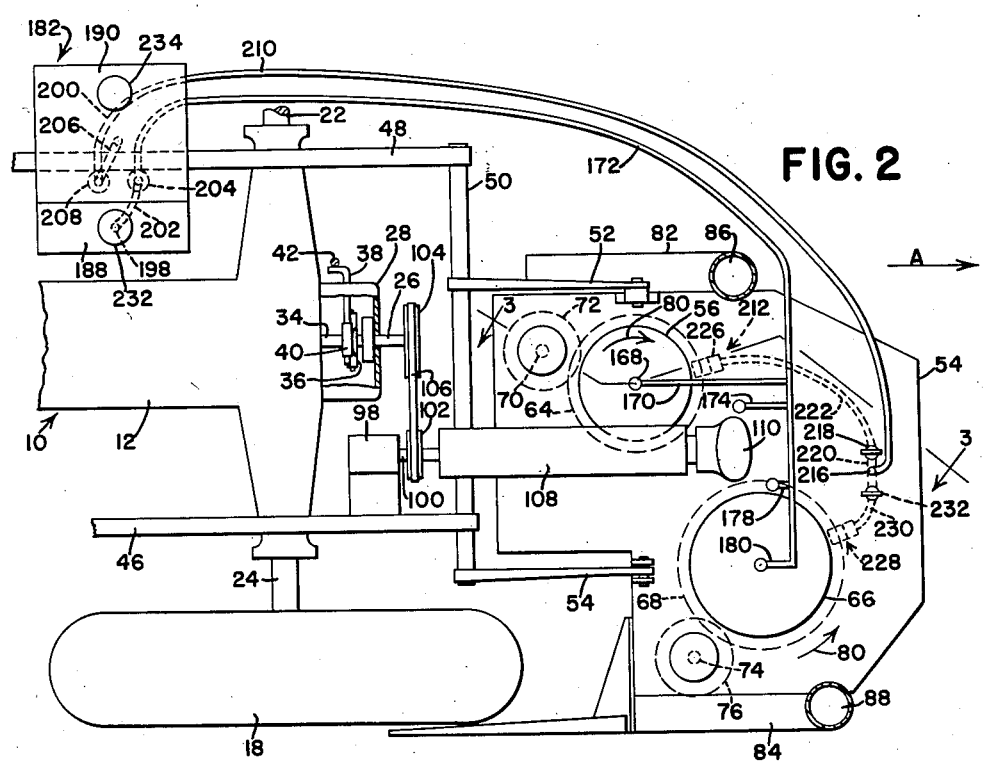
INVENTOR.
R. H. MEIER June 18, 1957  R. H. MEIER  2,795,917
CONTROL MECHANISM FOR COTTON PICKING UNITS
AND MOISTENING MEANS
Filed Dec. 29, 1954  3 Sheets-Sheet 3
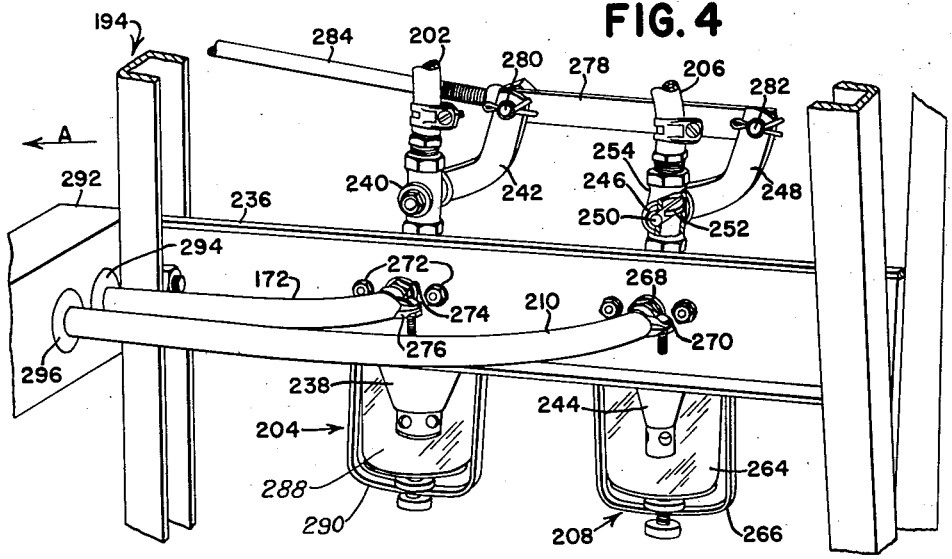
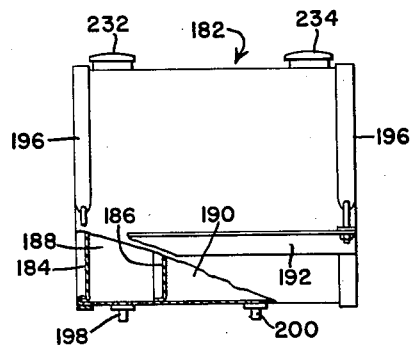
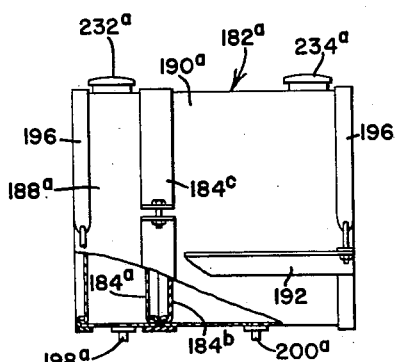
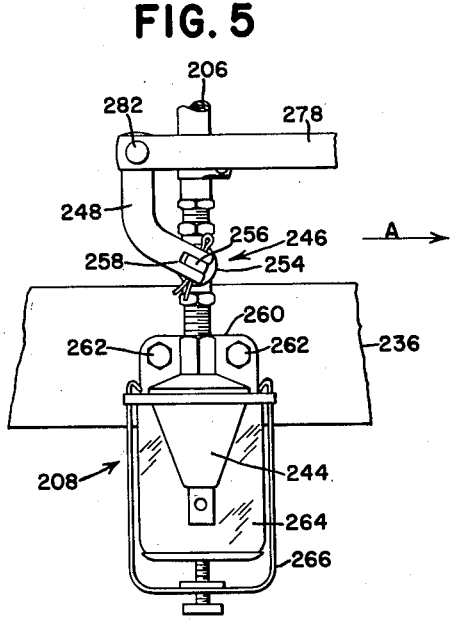
INVENTOR.
R. H. MEIER

United States Patent Office 2,795,917
Patented June 18, 1957

2,795,917

CONTROL MECHANISM FOR COTTON PICKING UNITS AND MOISTENING MEANS

Robert H. Meier, Des Moines, Iowa, assignor to Deere Manufacturing Co., Dubuque, Iowa, a corporation of Iowa Application December 29, 1954, Serial No. 478,226

11 Claims. (Cl. 56—44)

This invention relates to a cotton picker and more particularly to coordinated control mechanism operatively interconnecting the cotton picker power control means and means for regulating the supply of liquid or liquids such as lubricant and water or other moistener liquid to the picking unit.

In a conventional cotton picker of the rotating-spindle type, the machine will include a mobile frame adapted for advance over a field of row-planted cotton. The frame will carry one or more picking units, each of which includes a drum carrying a plurality of rotating spindles, barbed or otherwise, adapted to pluck the cotton from the ripe bolls as the machine advances. It is not unconventional in a machine of this character to apply to the spindles a measured amount of moistener liquid, which may be plain water or water to which is added a suitable wetting agent, the purpose of the moistener liquid being to facilitate the picking of cotton as well as doffing of the spindles. It is also conventional to supply to the picking mechanism, primarily the drive means for the spindles and the controlling components for the drum, a measured supply of lubricant.

For the purpose of accomplishing the results generally identified above, the machine will ordinarily carry some form of reservoir or reservoirs for the different types of liquid, the more advanced designs utilizing separate containers for the two kinds of liquid. When the machine is stopped, it is desirable to discontinue the respective supplies of liquid, in order to avoid waste and also to avoid the distribution of excess lubricant which may find its way out onto the spindles and spoil the cotton. Heretofore, the shut-off means for the two liquid supply systems has included separate valves, each of which was individually and manually controlled. In many instances, the operator would forget to shut off one or both valves and the consequent disadvantages could not be avoided. According to the present invention, the shut-off valves are coordinated with control means for the picker unit so that, in one form of the invention, when the power source or the picking unit is cut off, the liquid supply systems are automatically cut off and, in another form of the invention, when the power source, such as the engine for the picker, is adjusted to a position of closed throttle, the supply systems are automatically cut off. In both forms of the invention, the coordination between the supply valves and whichever control member is used is simply and inexpensively accomplished and provides a foolproof arrangement so that when the operator shuts the machine down he cannot help but discontinue the supply of liquids to the picking unit.

The invention features the provision of mechanisms for accomplishing the foregoing results in a facile manner, primarily one in which the coordination of the controls may be accomplished by means providing an attachment to an existing machine; although, the arrangement can as well be built in at the factory. Other features of the invention will appear as a preferred embodiment of the invention and a modification thereof are disclosed in detail in the ensuing specification and accompanying sheets of drawings, the several figures of which are described below.

Fig. 1 is a perspective side view of a typical cotton picker, portions of the machine being broken away to expose part of the drive means.

Fig. 2 is a schematic plan view, partly in section, illustrating the major components involved in the control and supply systems.

Fig. 3 is a fragmentary sectional view as seen generally along the line 3—3 of Fig. 2 but "flattened" to bring into the fore parts that would otherwise be hidden, the view further being drawn to a scale somewhat enlarged over that of Fig. 2.

Fig. 4 is a fragmentary enlarged view showing the mounting of the regulators and associated parts for the two liquid supply systems.

Fig. 5 is a view of one of the regulators from the side opposite to that shown in Fig. 4.

Fig. 6 is an elevational view, partly in section, of one form of dual container.

Fig. 7 is a modified container arrangement in which separate containers are coaxially arranged in end-to-end relationship.

Fig. 8 is a fragmentary view, based on a portion of Fig. 1, and illustrating a modified form of control interconnection.

The cotton picker or cotton picker machine chosen for the purposes of illustration is somewhat similar to that shown in the U. S. patent to Bopf 2,672,001; except that the machine shown here is of the one-row type, whereas that shown in the Bopf patent is of the two-row type. However, the fundamental differences are without significance here. Another slight difference is in the type of propelling vehicle but again the difference is not material. As shown here, the cotton picker comprises a mobile frame 10, comprising essentially a tractor of the type shown in the U. S. patent to McCray 1,919,069. As such, this tractor has a longitudinal fore-and-aft body 12 carried at its front end on a steerable wheeled truck 14 and at its rear end on a pair of laterally spaced traction wheels 16 and 18. Because of the manner in which the tractor 10 is operated, its normal direction of travel is opposite to that normally assumed. In other words, the tractor-mounted picker normally moves in the direction of the arrow A and consequently the traction wheels 16 and 18 become front wheels and the steerable truck 14 becomes a dirigible rear wheel assembly. References to the machine as having "front" and "rear" ends will hereinafter be made on the basis of the operation of the machine in the direction of the arrow A.

Because of its inclusion of the tractor 10, the machine will therefore have a power source including among other things a conventional internal combustion engine 20, a power train (not shown, but carried in the rear portion of the body 12) and including axles 22 and 24 respectively for the traction wheels 16 and 18 and a power take-off shaft 26 suitably contained in a housing 28 at the now front of the tractor body 12. A representative power train may be seen in the U. S. patent to Fletcher 2,676,686.

The internal combustion engine 20 is under control of a control member or arm 30 associated with a governor, designated generally by the numeral 32, which governor may be similar to that shown in the U. S. patent to McCormick 2,236,803, or which may be any suitable type of speed regulator for modifying the speed of the engine 20. As is conventional in the operation of tractors, the speed of the engine combined with the selected speed ratio of the transmission determines the rate of advance of the tractor. In the present case, the tractor is driven in reverse in order that it may travel in the direction of the arrow A. Hence, the speed of travel of the tractor may be regulated by adjusting the control arm 30 and thereby adjusting the speed of the engine.

Since, as shown best in the above-identified Fletcher patent, the power take-off shaft 26 is driven directly from the engine 20, the speed of rotation of the power take-off shaft will vary in accordance with variations in the speed of the engine. The governor 32 varies the engine throttle (not shown) as is conventional and therefore may have first and second positions respectively effective to mobilize or demobilize the power source as represented by the engine 20. That is to say, the control or regulator arm 30 may be moved to a closed-throttle position, thus "killing" the engine or may be moved to its first or open position in which the engine operates at a speed sufficient to propel the vehicle and drive the picking mechanism. In either event, the power take-off shaft 26 will depend for operation on the position of the control member 30.

However, the power take-off shaft 26 may be independently controlled, because, as shown here and as described in greater detail in the above-identified Fletcher patent, the power take-off shaft is selectively connectible to and disconnectible from an engine-powered driving shaft 34 by means of a clutch 36 under control of a control means including a rockshaft 38, carried by the power take-off housing 28; a throw-out fork 40, fixed to the inner end of the rockshaft 38 and engaging the clutch 36; and a control link 42.

In a tractor-mounted cotton picking machine as illustrated here, the picker includes fore-and-aft framework 44 having right- and left-hand side frame members 46 and 48, the forward ends of which are cross-connected by a rockshaft 50. This rockshaft, by means of supports such as arms 52, carries a picking unit 54. This picking unit is of the rotating spindle type as shown, for example, in the above-identified Bopf patent. To the extent deemed material here, the unit is shown in Fig. 3 as including a picking drum 56 which has an upper drum head 58 keyed to the lower end of an upright shaft 60. The drum head carries at uniformly angularly spaced points thereabout a plurality of upright picker bars 62, each of which carries a series of vertically spaced picker spindles, the entire group of which is deemed to be represented by the single spindle shown at 64. The orientation of the drum 56 and spindle 64 relative to the unit 54 is represented in Fig. 2 wherein the drum 56 is illustrated by the full-line circle and the path of the spindle 64 is represented by the dotted-line circle, also numbered 64. The presence of a second drum is indicated by circles 66 and 68.

As is also conventional, each drum is associated with doffer means, the shaft of which appears at 70 in Fig. 3 as representative of the doffer that cooperates with the drum 56. A dotted circle 72 in Fig. 2 represents the circular character of the doffer means. The small and large dotted circles 74 and 76 in Fig. 2 represent a second doffer arrangement associated with the drum 66. Since the details are brought out in the above-identified Bopf patent, as well as elsewhere, further elaboration is deemed unnecessary. Suffice it to say that as the machine advances, the drums 56 and 66 operate to cause their spindles to pass into and out of the cotton to pluck cotton from the ripened bolls, the drums moving rearwardly or respectively in the directions of the arrows 78 and 80 into respective cooperation phases with the doffers 72 and 76, the doffers serving to remove the cotton from the spindles and to cause the cotton to move outwardly into left- and right-hand hollow door structures 82 and 84. These door structures are associated with pneumatic conveying means including left- and right-hand conduits 86 and 88 that lead to a fan housing 90 supported on a frame 92 at the front left-hand side of the cotton picker frame 44. The fan housing discharges rearwardly and upwardly through a conduit 94 to a receptacle 96 on the machine.

The power take-off shaft 26, previously described, serves as drive means for cooperating with drive means in the unit 54 to drive the mechanism in the picker drum 56. For this purpose, the right-hand picker frame member 46 carries a bearing 98 in which is journaled an output shaft 100. A sheave 102 on this shaft and a sheave 104 on the power take-off shaft 26 are interconnected by a belt 106. The shaft 100 extends forwardly through an appropriate shield 108 and enters a gear housing 110 within which is contained appropriate drive gearing (not shown) for driving the drum 56 and spindles 64 associated therewith. Details of this character are brought out in the above-identified Bopf patent and need not be developed here. Suffice it to say that the drum shaft is rotatable about its upright axis and carries therewith the drum head 58 which in turn carries the picker bars 62. The upper end of each picker bar 62 has keyed thereto a control arm 112, the free end of which has a roller 114 that rides in a cam track member 116 fixed to an intermediate plate 118 in the unit 54. The cam track is of an irregular shape but is endless and although the picker bars 62 travel in a circular orbit, the rollers 114 follow a different orbit, thereby imparting oscillation to the spindles 64 in a well-known manner. In addition to driving the drum shaft 60, the spindles 64 in each individual column 62 are driven by an upright spindle-drive shaft 120 through the medium of intermeshing bevel gears 122 enclosed within the associated column. The upper end of each spindle-drive shaft has fixed thereto a small pinion 124 and these pinions are in constant mesh with a drive gear 126. Suitable means, not shown, is provided for driving the gear 126, part of which means is visible in the form of a hub 128 for said gear. For purposes of the present disclosure, it is sufficient to know that the drum shaft 60 rotates, carrying with it the parts connected thereto, and the gear 126 is driven at a different rate of speed for rotating the individual spindle shafts 120.

The picker frame 44 is provided at its forward end with an operator's station or platform 130, from the extreme forward end of which rises a standard 132 on which is journaled a steering wheel 134 for the steerable wheeled truck 14. The platform 130 also carries an operator's seat 136, adjacent to which are conveniently arranged a plurality of controls, those significant here being a power take-off clutch control member 138 and a speed regulator or throttle control member 140. The power take-off control member or lever 138 is fixed at its lower end to a transverse rockshaft 142, to which rockshaft is fixed a forwardly extending arm 144. The clutch control link 42, previously described, is connected at its upper end to the arm 144. Hence, rocking of the power take-off control lever 138 controls the power take-off clutch 36. Specifically, rocking of the lever 138 rearwardly or in the direction of the arrow 146 (Fig. 1) engages the power take-off clutch 36 and thus mobilizes the connection between the output means of the tractor and the drive means of the picker unit 54, the output means of the tractor including, as previously described, the engine 20, the power train (not shown) and the power take-off shaft 26, and the drive means for the picker unit including at least the drum shaft 60 and the picker shaft drive gear 126 and parts associated therewith such as the pinions 124, spindle shafts 120 and spindle bevel gears 122.

The tractor is equipped with a throttle control lever 148 for controlling the governor 32 and for this purpose the lower end of the lever 148 is connected by a link 150 to the governor control member or arm 30. When the tractor is used as the propelling vehicle for the cotton picker, the operator seat 136 is remote from the throttle 148 and therefore the throttle lever 140 on the picker operator's platform 130 is connected by a link 152 to the tractor throttle lever 148. The picker throttle lever 140 is pivoted at 154 intermediate its ends on the seat 136. Movement of the picker throttle lever 140 forwardly or in the direction of the arrow 156 increases the engine speed of the tractor engine 20 and movement in the reverse direction decreases the engine speed, it being possible to move the throttle levers 140 and 148 in said reverse direction to a maximum position causing the engine 20 to stop.

Lubrication of the picker unit is accomplished by the provision of lubricant supply means designated generally by the numeral 158 (Fig. 3). The lubricant supply means, as represented here, comprises an axial bore 160 in the drum shaft 60, which bore communicates at its lower end via a radial bore 162 with a radial supply tube 164. The outer or terminal end of the tube enters an opening 166 in a picker bar 62, the lubricant passing thence into the interior of the picker bar to lubricate the bevel gearing 122 and bearings (not shown) associated therewith. It will be understood that there can be as many tubes 164 as there are picker bars 62. Of course, the specific type of lubricant supply means is not per se material, for any other kind could be used.

Lubricant enters the axial bore 160 in the drum shaft 60 via a top fitting 168 to which is connected a lubricant supply line or conduit 170, this conduit branching off of a main line or conduit 172. A second branch line 174 branches off of the main line 172 and feeds via a supply tube 176 to the cam track 116. The line 172 extends to the right and has branches 178 and 180, respectively, for the cam track and drum 60 of the other picking mechanism.

Lubricant is supplied in the first instance from one of a pair of compartments afforded by container means, which means is designated generally by the numeral 182. One form of container means, as best shown in Fig. 6, and as illustrated also in Fig. 2, comprises a container structure of cylindrical configuration having opposite circular end walls, one of which appears at 184, and a circular partition 186, which partition divides the container structure or means into first and second compartments 188 and 190. The compartment 188 is an oil compartment, being adapted to contain oil or other suitable lubricant. The compartment 190, sometimes hereinafter called a water compartment, is adapted to contain water or water mixed with a suitable wetting agent to afford a moistener liquid or fluid for supply to the spindle 64 by means to be presently described. The container structure 184 is carried or supported on an upper frame part 192 of support means 194, the upper support or frame part representing or affording a platform to which the tank structure 182 is rigidly secured as by a pair of circumscribing bands 196.

The first or oil compartment 188 has a bottom outlet 198 and the second or water compartment 190 has a bottom outlet 200. The outlet 198 is connected by an inlet line 202 to a regulator or regulator means, designated generally by the numeral 204, connected between the inlet line 202 and the line 172, previously described, which line represents an outlet line from the regulator 204 to the lubricating or lubricant-supply device 158.

The water outlet 200 is connected by an inlet line 206 to a second regulator or regulator means 208, which means is connected by an outlet line 210 to a moistener device 212 on the picker unit 54.

The moistener device may be of the type fully disclosed in the U. S. patent to Grosvenor 2,654,204, or it may be of any other suitable type. For purposes of the present disclosure, it is deemed sufficient to note that the device comprises an upper distributor 214 to which moistener liquid is supplied from the line 210 via fittings 216 and 218 and branch lines 220 and 222. The distributor leads to a plurality of conduits, such as 224, and each conduit has thereon a moistener pad 226 by means of which the moisture is transferred to the spindles of a proximate layer of spindles, it being understood that there are other pads like 226 spaced vertically on the order of the vertical spacing of the layers of spindles, all of which is conventional. The fitting 216 involves a drain cock and the fitting 218 is a shut-off cock, details of which are not particularly significant. A second moistener 228 is supplied from a branch line 230 in which is located a shut-off cock 232. These shut-off cocks are useful for regulating the volume of fluid transferred to the moisteners 226, since the entire system is based upon gravity; that is, there is no means such as a pump or the like for forcing liquid into the moistener devices 212 and 228.

The first and second compartments may be filled, respectively, through filler necks having removable covers 232 and 234.

The frame or support structure 194, previously described as affording an upper frame part 192, also affords a lower frame part or mounting member 236 on which the regulators 204 and 208 are mounted. Since the regulator 204 is associated with the first or oil compartment or tank 188, it may be referred to as a first regulator. As such, it comprises a liquid or oil filter 238, the inlet line 202, the outlet line 172 and an interposed valve 240, with which valve is associated a first valve actuator 242. The second regulator 208 comprises the inlet line 206, the outlet line 210, a water or liquid filter 244 and a second valve 246 with which is associated a second valve actuator 248. The details of the valve 246 and its associated actuator are shown in Fig. 4, from which it can be accepted that the details of the other valve 240 and its actuator are the same. As shown in Fig. 4, the valve 246 includes a rockshaft 250 to which is rigidly secured within a valve housing 252 a butterfly or other suitable valve member 254. The opposite end of the rockshaft, as at 256 (Fig. 5), is flattened and receives the bifurcated end 258 of the actuator 248. The valve is shown in Figs. 4 and 5 as in its closed position; that is, it blocks the transmission of fluid from the line 206 to the filter 244 and hence disconnects the fluid flow between the lines 206 and 210. Stated more broadly, the fluid flow from the water compartment 190 to the moistener devices 212 and 228 is discontinued.

The filter 244 is part of an assembly that includes a casting 260 secured by bolts 262 to the frame member 236. This casting carries below it a glass bowl 264, which is retained in place by a bail 266, all of which is conventional construction and per se forms no part of the present invention. The casting 260 includes as an integral part thereof an outlet fitting 268 which projects through the frame or mounting member 236 to receive the end of the outlet line or hose 210, a suitable clamp 270 being used to effect the connection.

As will be seen, the filter assemblies for the oil and water are substantially identical, with the exception that the filter 238 is somewhat larger than the filter 244. Nevertheless, these details are immaterial here. The assembly that is included in the oil filter 238 includes a casting similar to the casting 260 and that casting is secured to the mounting member 236 as by bolts 272. Further included in the casting for the oil filter 238 is a fitting 274 which is connected to the proximate end of the line or hose 172 as by a clamp 276. Here again, the details can be varied, it being important only to note that the regulators 204 and 208 are carried in close proximity to each other and in compact relationship on the mounting member 236 directly below the tank structure 182.

As already suggested, the oil valve actuator 242 is connected to the oil valve 240 in a manner similar to the connection of the water valve actuator 248 to the water valve 246. Connecting means in the form of a link 278 is used to connect the actuator arms 242 and 248, the connections at opposite ends of the link being pivotal, as at 280 and 282, respectively. The link 278 establishes a situation in which control of one valve is accompanied by control of the other valve and both valves will be moved to their closed positions simultaneously in response to movement of the link 278 in one direction and both valves will move to their open position in response to movement of the link 278 in the opposite direction.

According to the present invention, opening and closing of the valves 240 and 246 is effected in response to control of the picking unit. In accordance with one form of the invention, as best shown in Fig. 1, coordination of the valves 240 and 246 is related to the power take-off control lever 138. For this purpose, the front pin 280 that connects the link 278 to the oil actuator arm 242 serves also to establish a connection with interconnecting means in the form of a rod 284 that has its front end connected at 286 to a portion of the power take-off control lever 138 just above the rockshaft 142. Hence, rearward movement of the control lever 138 in the direction of the arrow 146 causes simultaneous movement of the actuator arms 242 and 248 in the same direction, resulting in opening of the valves at the same time that the power take-off shaft clutch 36 is engaged. Conversely, movement of the control lever 138 in the opposite direction to disengage the power take-off shaft clutch 36 results in simultaneous closing of the valves 240 and 246. Hence, whenever the picking unit is disconnected from the output means as represented by the power source on the tractor, both the oil and water supplies are discontinued, thus avoiding waste of liquid and possible damage should an excess quantity of lubricant find its way out of the picking mechanism and onto the spindles 64.

For the purpose of completing the description of the regulator 204, it should be noted that the filter 238 has associated therewith a glass bowl 288 which is retained in place by a removable bail 290.

Fig. 7 represents a modified form of container or tank structure and is designated generally by the numeral 182a. In this case, the structure is made up of two separate cylindrical tanks or containers 188a and 190a. These tanks respectively include proximate end walls 184a and 184b, which are placed together or in side-by-side relationship, the containers being cylindrical and the arrangement being such that the containers are coaxial. The two containers are secured together by a common circumscribing band 184c and the assembled container means 182a is mounted on the structure 192 as by the circumscribing mounting bands 196. The tanks 188a and 190a respectively have outlets 198a and 200a, and further respectively have removable filler neck covers 232a and 234a. The structures of either Fig. 6 or 7 may be used with the coordinated control mechanism of Fig. 1.

Fig. 8 illustrates a modified form of coordinated control in which the valve actuators 242 and 248, interconnected by the link 278 as already described, is connected to the speed regulator lever 140 on the picker rather than to the power take-off lever 138. For this purpose, there is provided an interconnecting means in the form of a link 284a connected at 286a to the lower end of the lever 140. Hence, when the lever 140 is moved forwardly or in the direction of the arrow 156, it will operate through the link 284a to move both of the valves 240 and 246 as well as the tractor speed lever 148 in the direction of open, and vice-versa. This arrangement may use either the tank structure of Fig. 6 or of Fig. 7.

In either form of the invention, the tank support means 194 can include an added frame member or support 292 having grommeted apertures 294 and 296 for supporting the lines 172 and 210, respectively.

The operation of the coordinated control mechanism is deemed to be obvious from what has already been described and a separate description is thought to be unnecessary. Various features of the invention not categorically enumerated will undoubtedly occur to those versed in the art, as will numerous modifications and alterations in the preferred embodiments of the invention illustrated, all of which may be achieved without departing from the spirit and scope of the invention.

What is claimed is:

1. In a mobile cotton picking machine having a picking unit and drive means therefor driven from a machine-carried output means under control of a control member selectively adjustable between first and second positions effective respectively to mobilize and demobilize the output means, the improvement comprising: a liquid container on the machine; a liquid supply device on and for supplying liquid to the picking unit; conduit means interconnecting the container and the device and including a valve movable between open and closed positions; an actuator connected to and for moving the valve; and means interconnecting the actuator and the control member for incurring the open and closed positions of the valve respectively in response to attainment by the control member of its first and second positions.

2. In a mobile cotton picking machine having a picking unit of the rotating-spindle type and spindle-drive means therefor driven from a machine-carried output means under control of a control member selectively adjustable between first and second positions effective respectively to mobilize and demobilize the output means, the improvement comprising: a container on the machine for holding spindle-moistening liquid; a liquid supply device on the unit for supplying liquid to the picking spindles; conduit means interconnecting the container and the device and including a valve movable between open and closed positions; an actuator connected to and for moving the valve; and means interconnecting the actuator and the control member for incurring the open and closed positions of the valve respectively in response to attainment by the control member of its first and second positions.

3. In a mobile cotton picking machine having a picking unit of the rotating-spindle type and spindle-drive means therefor driven from a machine-carried output means under control of a control member selectively adjustable between first and second positions effective respectively to mobilize and demobilize the output means, the improvement comprising: a lubricant container on the machine; a moistener-liquid container on the machine; a lubricant supply device on the unit for supplying lubricant to the spindle-drive means; a spindle-moistener device on the unit for supplying moistener-liquid to the spindles; first and second separate conduit means respectively interconnecting the lubricant container with the lubricant supply device and the moistener-liquid container with the moistener device, said conduit means respectively having first and second movable valve means, each valve means having open and closed positions; first and second actuators respectively connected to and for moving the valves; and means interconnecting the actuators and the aforesaid control member for incurring the open positions of the valves in unison in response to attainment by the control member of its first position and, selectively, for incurring the closed positions of both valves in unison in response to attainment by the control member of its second position.

4. The invention defined in claim 3, in which: the machine has a supporting platform; and the container respectively have end walls and are carried on the platform with one end wall of one proximate to one end wall of the other.

5. In a mobile cotton picking machine having a picking unit and drive means therefor driven from a machine-carried output means including a power take-off clutch engageable and disengageable under control of a control member selectively movable between engaged and disengaged positions effective respectively to engage and disengage the power take-off clutch, the improvement comprising: a liquid container on the machine; a liquid supply device on and for supplying liquid to the picking unit; conduit means interconnecting the container and the device and including a valve movable between open and closed positions; an actuator connected to and for moving the valve; and means interconnecting the actuator and the control member for incurring the open and closed positions of the valve respectively in response to attainment by the control member of its engaged and disengaged positions.

6. In a mobile cotton picking machine having a picking unit and drive means therefor driven from a machine-carried output means including a power plant having a throttle under control of a control member selectively adjustable between open and closed throttle positions, the improvement comprising: a liquid container on the machine; a liquid supply device on and for supplying liquid to the picking unit; conduit means interconnecting the container and the device and including a valve movable between open and closed positions; an actuator connected to and for moving the valve; and means interconnecting the actuator and the control member for incurring the open and closed positions of the valve respectively in response to attainment by the control member of its open and closed throttle positions.

7. In a cotton picker having a fore-and-aft mobile frame carrying a picking unit of the rotating-spindle type and spindle-drive means therefor and including output means under control of a control member selectively adjustable between first and second positions effective respectively to mobilize and demobilize the output means, the improvement comprising: support means on the frame and affording an upper frame part and a lower frame part generally in fore-and-aft alinement with the control member; container means affording first and second compartments arranged in side-by-side relation and supported on the upper frame part, said first compartment being adapted to hold lubricant and having a bottom outlet and said second compartment being adapted to hold spindle-moistening liquid and including a bottom outlet; a lubricant supply device on the unit for supplying lubricant to the spindle-drive means; a moistener device on the unit for moistening the spindles; first and second individual regulators carried by the aforesaid lower frame part, said first regulator having an inlet line connected to the first compartment, an outlet line connected to the lubricant supply device, and a line-control valve having open and closed positions, said second regulator having an inlet line connected to the second compartment, an outlet line connected to the moistener device, and a line-control valve having open and closed positions; first and second actuators connected respectively to and for positioning the first and second valves; connecting means joining the two actuators for movement together to open both valves simultaneously and for additional movement together to close both valves simultaneously; and means interconnecting the connecting means and the control member for incurring the open and closed positions of the valves respectively in response to attainment by the control member of its first and second positions.

8. The invention defined in claim 7, in which: the container means is cylindrical and has an intermediate circular wall structure separating said container means into said first and second compartments.

9. The invention defined in claim 7, in which: the container means comprises first and second cylindrical containers of like diameter, coaxially arranged to afford said first and second compartments, each container having an end wall proximate to and adjoining the end wall of the other container.

10. The invention defined in claim 9, in which: the containers are secured together by a band circumscribing the containers at the junction of said proximate end walls.

11. In a cotton picker having a fore-and-aft mobile frame carrying a picking unit of the rotating-spindle type and spindle-drive means therefor and including output means under control of a control member selectively adjustable between first and second positions effective respectively to mobilize and demobilize the output means, the improvement comprising: support means on the frame and affording a mounting member; container means affording first and second compartments arranged in side-by-side relation and carried on the support means, said first compartment being adapted to hold lubricant and having an outlet and said second compartment being adapted to hold spindle-moistening liquid and including an outlet; a lubricant supply device on the unit for supplying lubricant to the spindle-drive means; a moistener device on the unit for moistening the spindles; first and second individual regulators for the compartments, preselectively, said first regulator having a liquid filter carried on the mounting member, an inlet line interconnecting said filter and the first compartment, an outlet line interconnecting said filter and the lubricant supply device, and a line-control valve having open and closed positions, said second regulator also having a liquid filter carried on the mounting member adjacent to the first-mentioned filter, an inlet line interconnecting said second regulator filter and the second compartment, an outlet line interconnecting said second regulator filter and the moistener device, and a line-control valve having open and closed positions; first and second actuators connected respectively to and for positioning the first and second valves; connecting means joining the two actuators for movement together to open both valves simultaneously and for additional movement together to close both valves simultaneously; and means interconnecting the connecting means and the control member for incurring the open and closed positions of the valves respectively in response to attainment by the control member of its first and second positions.

References Cited in the file of this patent
UNITED STATES PATENTS

| | | |
|---|---|---|
| 2,595,601 | Paradise | May 6, 1952 |
| 2,650,462 | Skaggs | Sept. 1, 1953 |
| 2,654,204 | Grosvenor | Oct. 6, 1953 |
| 2,660,850 | Rust | Dec. 1, 1953 |
| 2,672,001 | Bopf et al. | Mar. 16, 1954 |
| 2,711,066 | Barbknecht | June 21, 1955 |